July 15, 1930.　　　　S. E. ALLEY　　　　1,770,381
SINGLE ACTING STEAM ENGINE
Filed March 30, 1927　　2 Sheets-Sheet 2
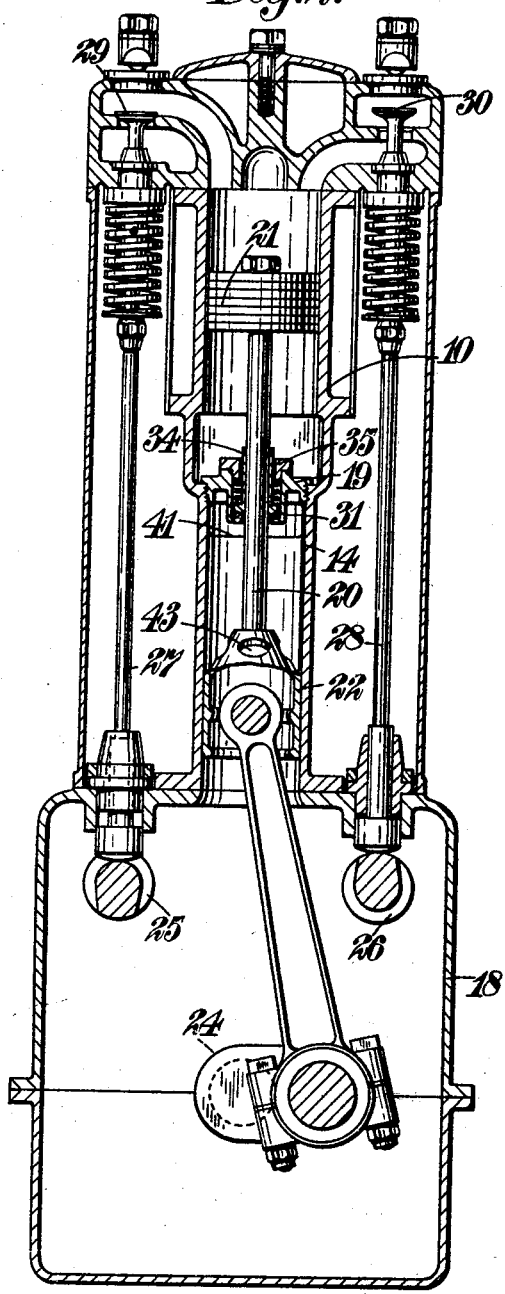
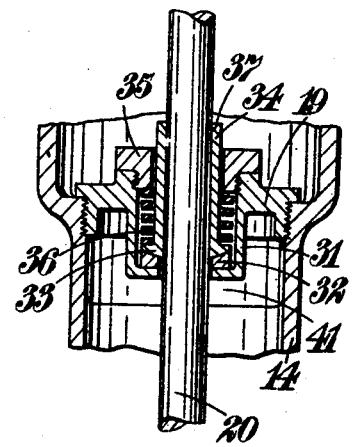
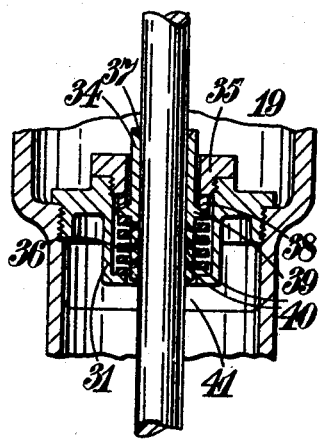

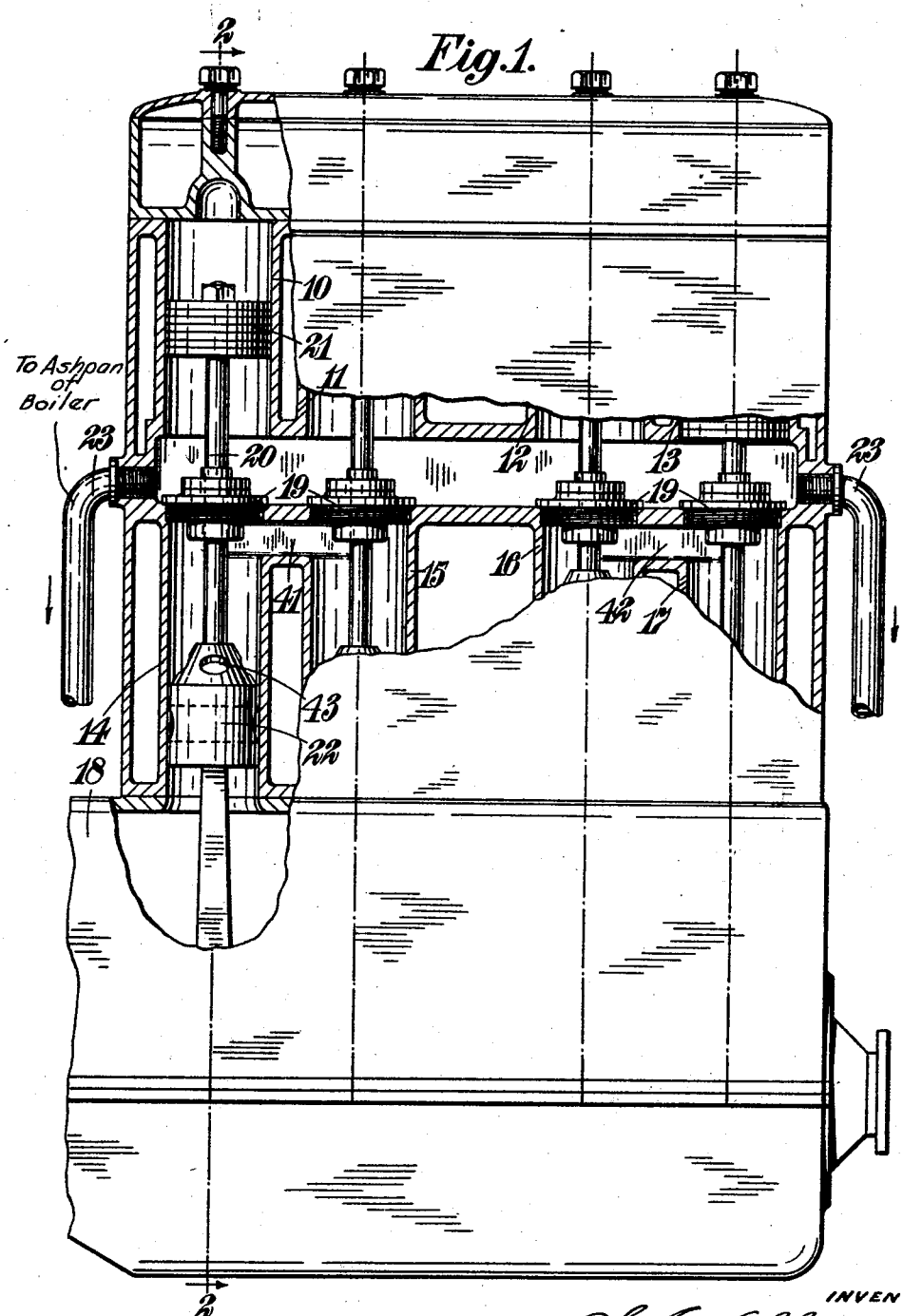

Patented July 15, 1930

1,770,381

UNITED STATES PATENT OFFICE

STEPHEN EVANS ALLEY, OF LONDON, ENGLAND

SINGLE-ACTING STEAM ENGINE

Application filed March 30, 1927, Serial No. 179,694, and in Great Britain April 17, 1926.

This invention relates to single-acting steam engines of the type in which the steam is exhausted without being brought into that portion of the engine cylinder on the side of the engine piston remote from the side to which the working pressure is applied. The invention has for one of its objects to provide a construction which shall not be subject to certain disadvantages inherent to single-acting steam engines as heretofore constructed. With double-acting steam engines the cylinder cover through which the piston rod passes is, of course, packed with a stuffing box or the like in order to make a tight joint with the sliding piston rod, but with some kinds of single-acting steam engines as hitherto known the working pressure is applied to that face of the piston which is remote from the crank case and the latter is not isolated from the piston; consequently, any leakage past the piston is apt to pass into the crank case where it mixes with the oil and so interferes with the lubrication of the crankshaft and other bearings. In other kinds of these engines, pressure has been allowed to occur in the space between the piston and the cross-head guides, with the result that steam or water has been forced into the latter, and from there has passed to the crankcase. The oil, having to be such as to be suitable for lubricating, even though it may be diluted with water, has to be of a nature which will not saponify; such oil is not always easily obtainable. Furthermore, when, owing to wear, the leakage to the crank case assumes rather large proportions an overflow from the crank case takes place washing away some of the lubricating oil.

According to the present invention there is provided a single-acting steam engine of the type above described, which comprises in combination a plurality of cylinders, cross-head guides and/or a crank case so connected to the cylinders as to form a pressure-equalizing chamber that is located between them and the cylinders and has an outlet for drainage, with which chamber the open end of each cylinder is in free communication, a piston in each cylinder, a piston rod extending from that face of each piston to which pressure is not applied and reaching through said chamber, and diaphragms or covers, one allotted to each cylinder, which isolate the chamber from the cross-head guides and/or crank case of the engine and each has one of the piston rods sliding through it with a tight joint, the cylinders having inlet and exhaust ports which are isolated from the said chamber so as to preclude the delivery of steam under pressure to the latter. Thus, water will be excluded from the crank case, and the bearings in the latter will be properly lubricated and any readily obtainable oil can be employed for the purpose. Moreover, there will be no fear of the oil being washed out of the crank case.

The said pressure-equalizing chamber may be provided with drainage means leading clear of the cross-head guides and/or crank case of the engine. For instance, one or more pipes may be provided leading to the ash pan of the boiler supplying steam to the engine. Leakage past the piston will, in such an arrangement, be easily determined.

Another object of the invention is to preclude the movement of the cross-heads from generating pressure in the cross-head guides such as might be liable to force lubricating oil from the guides through the aforesaid diaphragms or covers and cause it to be wasted.

A further object of the invention is to provide a stuffing box or a floating sleeve of improved construction through which the piston rod slides at a diaphragm.

Yet another object is to so construct the sleeve that it will serve to collect oil from the surface of the piston rod and retain it for redistribution thereon, thereby avoiding such oil being allowed to drain away with any leakage of steam or water which may occur past the piston.

For a more complete understanding of the invention, there will now be described, by way of example only and with reference to the accompanying drawings, one constructional form of vertical steam engine according to the invention. It is to be understood, however, that the invention is not limited to the precise constructional details set forth, nor to vertical engines.

In these drawings:—

Figure 1 is a side elevation of the engine;

Figure 2 is a vertical section on the line 2—2 of Figure 1;

Figure 3 is a detail section, on a scale larger than that of the preceding figures, showing means for making a tight joint between the piston rod and the diaphragm or cover; and Figure 4 is a view, similar to Figure 3, of a modified construction.

Like reference characters indicate like parts throughout the drawings.

Engines according to the present invention are particularly suitable for use on road or rail vehicles, but are also suitable for other purposes. The constructional form of engine shown has four vertical cylinders 10, 11, 12, 13 respectively, which are arranged side by side in a single row with the cross-head guides 14, 15, 16 and 17 and the crank case 18 below them, the lower ends of the cylinders being fully open. The cross-head guides are cylindrical and their upper ends are closed by diaphragms or covers 19. The piston rods 20 pass through these diaphragms 19 and carry above them the pistons 21 and below them the cross-heads 22. As will be seen, particularly from Figure 1, the spaces above the diaphragm 19 for each cylinder are inter-connected, constituting the aforesaid pressure-equalizing chamber, in which the contents merely surge about but are not subjected to pressure. At each end of the chamber a drainage pipe 23 is provided which may conveniently be arranged to lead to the ash pan of the boiler supplying steam to the engine. Just below the diaphragms 19 the guides 14 and 15 are connected by a conduit 41, and the guides 16 and 17 by a similar conduit 42. The pistons in the cylinders 10 and 11 are shown in their middle positions, but are oppositely timed, that is to say, when the one is at the upper end of its stroke the other is at the lower end of its stroke; similarly the pistons in the cylinders 12 and 13 are oppositely timed. Consequently the corresponding cross-heads are oppositely timed. It therefore follows that the pressure in the inter-connected guides will be equalized and the pumping action of the cross-heads, which is not completely obviated by the perforations 43 in them, will thus merely cause the contents of the guides to surge about and will not tend to force lubricating oil from the guides past the diaphragms 19. The crank case 18, in addition to enclosing and providing bearings for the crank shaft 24, also encloses and carries two cam shafts 25, 26 which operate the rods 27 and 28 for poppet valves 29 and 30 located at the upper end of the cylinders, there being preferably an inlet and exhaust valve for each cylinder. It will be appreciated that the valve ports are isolated from the pressure-equalizing chamber so that the steam is exhausted without being brought into the said chamber.

One construction of the diaphragms 19 is shown clearly in Figure 3, and it will be seen that the diaphragm is formed with a hollow central portion 31 which surrounds the piston rod 20 and is provided with a seating 32 whereof the upper surface is shaped to correspond with the lower surface of the spherical or like end 33 of a floating sleeve 34. This sleeve is a sliding fit on the piston rod and it is intended to rock with the latter and/or slide across the axis of the piston to accommodate irregularities in the path of the piston rod. Clearance is allowed between the piston rod and the members 31 and 32 for this purpose, and likewise an end closure 35, which forms an abutment for a spring 36, is spaced away from the outer surface of the sleeve 34. The seating 32 is also shown as having freedom for movement across the axis of the piston rod and can thus follow the rod should the latter be out of alignment. The spring 36 tends to keep the sleeve and seating 32 closely pressed together and thus to prevent leakage past the diaphragm 19. Consequently, any steam or water which passes the engine piston will not be permitted to find its way into the cross-head guides 14, 15, 16 and 17 or the crank case 18.

The upper end of the sleeve 34 is chamfered at 37 to form an annular cup around the piston rod, the angle of the chamber being, say, 45 degrees. This cup receives from the piston rod any excess oil which it may carry from the crank case and retains such oil, permitting it to be carried away again by the piston rod but precluding it from flowing away through the drainage conduits 23. It will be seen that the upper ends of the sleeves 34 are located above the drainage outlets.

Figure 4 shows a modified arrangement of the parts inside the diaphragm 19 which may usefully be employed in some circumstances. The seating 38 is similar to the aforesaid seating 32 but is inverted relatively to the latter and is located immediately underneath the end closure 35. The sleeve 34 has a flange 39 intermediate of its ends which has a spherical or like upper surface to bear against the seating 38, being pressed thereagainst by the spring 36. That surface of the sleeve 34 which bears against the piston rod is provided with one or more circumferential oil-collecting grooves 40, three being shown in the drawing. These grooves 40 communicate by suitable conduits with the interior of the portion 31 of the diaphragm 19 which is in communication with the interior of the cross-head guides. The grooves 40 serve to skim surplus oil from the piston rod and prevent it from passing up into the steam space.

From the foregoing it will be understood that the steam is admitted to and exhausted from the upper faces of the pistons during the normal working of the engine, and that such leakage past the pistons as occurs will be drained off through the conduits 23 without interfering with the lubrication of the working parts situated below the engine cylinders. Moreover, any undue leakage will readily be observed and leakage of oil by way of the piston rods will be reduced to the practicable minimum. Furthermore, leakage of oil from the cross-head guides is also prevented.

It is to be understood that the invention is not limited to the precise constructional details set forth.

I claim:—

1. A single-acting steam engine of the type described, comprising in combination a plurality of cylinders, cross-heads guides, a pressure equalizing chamber located between the cross-head guides and the cylinders and having an outlet for drainage, with which chamber the open end of each cylinder is in free communication, a piston in each cylinder, piston rods extending through said chamber to the cross-head guides, and diaphragms, one allotted to each cylinder, which isolate the chamber from the cross-head guides of the engine and have each one of the piston rods sliding through it with a tight joint, the cylinders having inlet and exhaust ports which are isolated from the said chamber so as to preclude the delivery of steam under pressure to the latter.

2. A single-acting steam engine of the type described, comprising in combination a plurality of cylinders, cross-head guides, a crank case, a pressure equalizing chamber located between the cross-head guides and the cylinders, and with which chamber the open end of each cylinder is in free communication, a drainage conduit leading from the chamber, a piston in each cylinder, piston rods extending through said chamber to the cross-head guides, and covers, one allotted to each cylinder, which isolate the chamber from the cross-head guides and crank case of the engine and have each a stuffing box through which one of the piston rods slides with a tight joint, the cylinders having inlet and exhaust ports which are isolated from the said chamber so as to preclude the delivery of steam under pressure to the latter.

3. A single-acting steam engine of the type described, comprising in combination a plurality of working cylinders, cross-head guiding cylinders, cross-heads which are closely received in the said guiding cylinders, a pressure equalizing chamber located between the cross-head guides and the engine cylinders and having an outlet for drainage, with which chamber the open end of each engine cylinder is in free communication, a piston in each engine cylinder, piston rods extending through said chamber and connecting the pistons and cross-heads, diaphragms, one allotted to each engine cylinder, which isolate the chamber from the cross-head guides of the engine and have each one of the piston rods sliding through it with a tight joint, and pressure equalizing means communicating with the interior of the cross-head guiding cylinders at positions between the said diaphragms and the cross-heads, the engine cylinders having inlet and exhaust ports which are isolated from the first mentioned pressure equalizing chamber so as to preclude the delivery of steam under pressure to the latter.

4. A single-acting steam engine of the type described, comprising in combination a plurality of working cylinders, cross-head guiding cylinders, cross-heads which are closely received in the said guiding cylinders, a pressure equalizing chamber located between the cross-head guides and the engine cylinders and having an outlet for drainage, with which chamber the open end of each engine cylinder is in free communication, a piston in each engine cylinder, piston rods extending through said chamber and connecting the pistons to the cross-heads, diaphragms, one allotted to each engine cylinder, which isolate the chamber from the cross-head guides of the engine and have each one of the piston rods sliding through it with a tight joint, and pressure equalizing means inter-connecting the interiors of two cross-head guiding cylinders, wherein the cross-heads are oppositely timed, said means being disposed between the said diaphragms and the cross-heads, the engine cylinders having inlet and exhaust ports which are isolated from the first mentioned pressure-equalizing chamber so as to preclude the delivery of steam under pressure to the latter.

5. A single-acting steam engine comprising a plurality of engine cylinders, cross-head guiding cylinders, a cross-head closely received in each cross-head guiding cylinder, a piston in each engine cylinder, piston rods extending into the cross-head guiding cylinders and connecting the pistons and cross-heads, diaphragm isolating the engine cylinders from the cross-head guiding cylinders, the engine cylinders having inlet and exhaust ports which are isolated from the said diaphragms so as to preclude the delivery of steam under pressure to the latter, a pressure equalizing chamber between the diaphragms and the pistons to prevent substantial rise of pressure, said chamber having an outlet for drainage, and pressure equalizing means applied to the cross-head guiding cylinders between the cross-heads and the diaphragms to prevent substantial rise of pressure therein.

6. A single-acting steam engine comprising in combination a plurality of cylinders, cross-head guides, a cross-head received in each guide, a piston in each cylinder, piston rods extending into the cross-head guides, diaphragms isolating the cylinders from the cross-head guides and each having a stuffing box through which the corresponding piston rod slides with a tight joint, the cylinder having inlet and exhaust ports which are isolated from the said diaphragms so as to preclude the delivery of steam under pressure to the latter, a pressure equalizing chamber between the diaphragms and the pistons to prevent substantial rise of pressure, said chamber having an outlet for drainage, each said stuffing box comprising a sleeve closely surrounding the piston rod and formed with a spherical portion, a seating for said spherical portion, which seating is situated in the diaphragm and surrounds the piston rod but is spaced away from the surface of the latter, and which seating is shaped to correspond with the shape of the spherical portion of the sleeve so that the latter can rock in it while retaining close contact with it, and resilient means pressing the sleeve and seating together.

7. A single-acting steam engine comprising in combination a plurality of cylinders, cross-head guides, a cross-head received in each guide, a piston in each cylinder, piston rods extending into the cross-head guides, diaphragms isolating the cylinders from the cross-head guides and each having a stuffing box through which the corresponding piston rod slides with a tight joint, the cylinders having inlet and exhaust ports which are isolated from the said diaphragms so as to preclude the delivery of steam under pressure to the latter, and a chamber intermediate the diaphragms and the pistons to prevent substantial rise of pressure due to piston movement, said chamber having an outlet for drainage, each said stuffing box comprising a sleeve closely surrounding the piston rod and formed with a spherical portion, a seating for said spherical portion, which seating is situated in the diaphragm with freedom for movement across the axis of the piston rod and surrounds the latter but is spaced away from its surface, and which seating is shaped to correspond with the shape of the spherical portion of the sleeve so that the latter can rock in it while retaining close contact with it, and resilient means pressing the sleeve and seating together.

8. A vertical single-acting steam engine comprising in combination a plurality of engine cylinders, cross-head guides located below the engine cylinders, a cross-head received in each guide, a piston in each engine cylinder, piston rods extending into the cross-head guides, diaphragms isolating the cylinders from the cross-head guides and each having a stuffing box through which the corresponding piston rod slides with a tight joint, the cylinders having inlet and exhaust ports which are isolated from the said diaphragms so as to preclude the delivery of steam under pressure to the latter, a chamber intermediate the diaphragms and the pistons and communicating with said cylinders to prevent substantial rise of pressure due to piston movement, said chamber having an outlet for drainage, each said stuffing box comprising a sleeve closely surrounding the piston rod and projecting upwardly towards the piston above the face of the diaphragm and recessed to form an annular cup surrounding the piston rod, said sleeve being also formed with a spherical portion, a seating for said spherical portion, which seating is situated in the diaphragm and surrounds the piston rod but is spaced away from the surface of the latter, and which seating is shaped to correspond with the shape of the spherical portion of the sleeve so that the latter can rock in it while retaining close contact with it, and resilient means pressing the sleeve and seating together.

9. A vertical single-acting steam engine of the type described, comprising in combination a plurality of cylinders, cross-head guides, said guides and the cylinders being spaced to form a pressure equalizing chamber communicating with the open end of each cylinder, a drainage conduit leading from the chamber, a piston in each cylinder, piston rods extending through said chamber to the cross-head guides, and diaphragms, one allotted to each cylinder, which isolate the chamber from the cross-head guides and each having a stuffing box through which one of the piston rods slides with a tight joint, the cylinders having inlet and exhaust ports which are isolated from the said chamber so as to preclude the delivery of steam under pressure to the latter, said stuffing boxes each comprising a sleeve closely surrounding the piston rod and projecting upwardly towards the piston above the face of the diaphragm and recessed to form an annular cup surrounding the piston rod at a level above the aforesaid drainage conduit, said sleeve being also formed with a spherical portion, a seating for said spherical portion, which seating is situated in the diaphragm and surrounds the piston rod but is spaced away from the surface of the latter, and which seating is shaped to correspond with the shape of the spherical portion of the sleeve so that the latter can rock in it while retaining close contact with it, and resilient means pressing the sleeve and seating together.

10. A single-acting steam engine comprising in combination a plurality of cylinders, cross-head guides, a cross-head received in each guide, a piston in each cylinder, piston rods extending into the cross-head guides, diaphragms isolating the cylinders from the cross-head guides and each having a stuffing box through which the corresponding piston rod slides with a tight joint, drainage means leading from the space between the diaphragms and the pistons, the cylinders having inlet and exhaust ports which are isolated from the diaphragms so as to preclude the delivery of steam under pressure to the latter, each said stuffing box comprising a sleeve closely surrounding the piston rod, that surface of the sleeve which bears against the rod being provided with a circumferential oil-collecting groove having communication with the space on that side of the diaphragm which is remote from the piston to return to such space any oil collected by the groove, and said sleeve being also formed with a spherical portion, a seating for said spherical portion, which seating is situated in the diaphragm and surrounds the piston rod but is spaced away from the surface of the latter, and which seating is shaped to correspond with a shape of the spherical portion of the sleeve so that the latter can rock in it while retaining close contact with it, and resilient means pressing the sleeve and seating together.

11. In a single-acting steam engine, the combination with a plurality of cylinders, of pistons within said cylinders, a crank case, and a chamber intermediate said pistons and crank case, said chamber being in free communication with the open ends of said cylinders, having a wall serving to isolate the chamber from the crank case, and having a drainage outlet, and piston rods secured to the pistons and extending through the chamber into the crank case, said wall being provided with a fluid-tight guide for each piston rod, said cylinders having inlet and exhaust ports which are isolated from said chamber to preclude the delivery of steam under pressure to the latter.

12. In a single-acting steam engine, the combination with a plurality of cylinders, of pistons within said cylinders, a crank case, and a chamber intermediate said pistons and crank case, said chamber being in free communication with the open ends of said cylinders, and having a drainage outlet, piston rods secured to the pistons and extending through said chamber into the crank case, and means for preventing passage of fluid from said chamber into said crank case, said cylinders having inlet and exhaust ports which are isolated from said chamber to preclude the delivery of steam under pressure to the latter.

13. In a single-acting steam engine, the combination with a plurality of cylinders, of pistons within said cylinders, a crank case, and a chamber intermediate said pistons and crank case, said chamber being in free communication with the open ends of said cylinders, and having a drainage outlet, piston rods secured to the pistons and extending through said chamber into the crank case, means for preventing passage of fluid from said chamber into said crank case, said cylinders having inlet and exhaust ports which are isolated from said chamber to preclude the delivery of steam under pressure to the latter, and a conduit leading from the chamber.

In testimony whereof I affix my signature.
STEPHEN EVANS ALLEY.